(12) United States Patent
Huang

(10) Patent No.: US 9,102,235 B2
(45) Date of Patent: Aug. 11, 2015

(54) METHOD FOR REACTIVATING OPERATION OF A CRUISE CONTROL SYSTEM THAT HAD BEEN INTERRUPTED

(75) Inventor: Pei-Shih Huang, Reichertshausen (DE)

(73) Assignee: Bayerisch Motoren Werke Aktiengesellschaft, Munich (DE)

( * ) Notice: Subject to any disclaimer, the term of this patent is extended or adjusted under 35 U.S.C. 154(b) by 551 days.

(21) Appl. No.: 12/652,291

(22) Filed: Jan. 5, 2010

(65) Prior Publication Data

US 2010/0114450 A1    May 6, 2010

Related U.S. Application Data

(63) Continuation of application No. PCT/EP2008/005023, filed on Jun. 21, 2008.

(30) Foreign Application Priority Data

Jul. 6, 2007 (DE) .......................... 10 2007 031 545

(51) Int. Cl.
G06F 19/00 (2011.01)
B60W 30/14 (2006.01)
B60K 31/00 (2006.01)

(52) U.S. Cl.
CPC ............ B60K 31/00 (2013.01); *B60W 2540/10* (2013.01); *B60W 2540/103* (2013.01); *B60W 2540/106* (2013.01)

(58) Field of Classification Search
CPC ................. B60W 2540/10; B60W 2540/103; B60W 2540/106; B60W 30/14
USPC ........................................................ 701/93
See application file for complete search history.

(56) References Cited

U.S. PATENT DOCUMENTS

| | | | | |
|---|---|---|---|---|
| 5,749,427 A | * | 5/1998 | Satonaka et al. | ............... 180/179 |
| 2013/0261889 A1 | * | 10/2013 | Sekine et al. | ................... 701/36 |

FOREIGN PATENT DOCUMENTS

| | | |
|---|---|---|
| DE | 101 45 915 A1 | 4/2003 |
| DE | 102 61 624 A1 | 7/2004 |
| DE | 103 47 844 A1 | 5/2005 |
| DE | 1 747 933 A1 | 1/2007 |
| DE | 10 2006 012 514 A1 | 9/2007 |
| EP | 0 355 967 A1 | 2/1990 |
| EP | 0 729 859 A2 | 9/1996 |
| EP | 1 233 391 A2 | 8/2002 |
| EP | 1 442 917 A2 | 8/2004 |
| EP | 1 459 930 A2 | 9/2004 |
| EP | 1 469 928 A2 | 9/2004 |
| FR | 2 780 350 A1 | 12/1999 |

(Continued)

OTHER PUBLICATIONS

"Betriebsanleitung zum Fahrzeug", BMW, Online Version fuer Sach Nr. 01 40 0 013 143, Jan. 2007 BMW AG (Seventeen (17) pages).
International Search Report dated Oct. 7, 2008 with English translation (six (6) pages).
German Search Report dated Jun. 25, 2008 with English translation (nine (9) pages).

(Continued)

*Primary Examiner* — John Q Nguyen
*Assistant Examiner* — Kyung Kim
(74) *Attorney, Agent, or Firm* — Crowell & Moring LLP

(57) ABSTRACT

A method for reactivating an interrupted cruise control function of a cruise control system of a vehicle is provided. When the vehicle is not in the stationary state, in order to allow the driver to reactivate intuitively the interrupted cruise control function, the driver may reactivate the interrupted cruise control function by actuating a gas pedal of the vehicle.

7 Claims, 1 Drawing Sheet

(56) References Cited

FOREIGN PATENT DOCUMENTS

| FR | 2 838 386 A1 | 10/2003 |
| FR | 2 853 596 A1 | 10/2004 |

OTHER PUBLICATIONS

EPO Office Action dated Jan. 30, 2012 with attached machine translation (eight (8) pages).

* cited by examiner

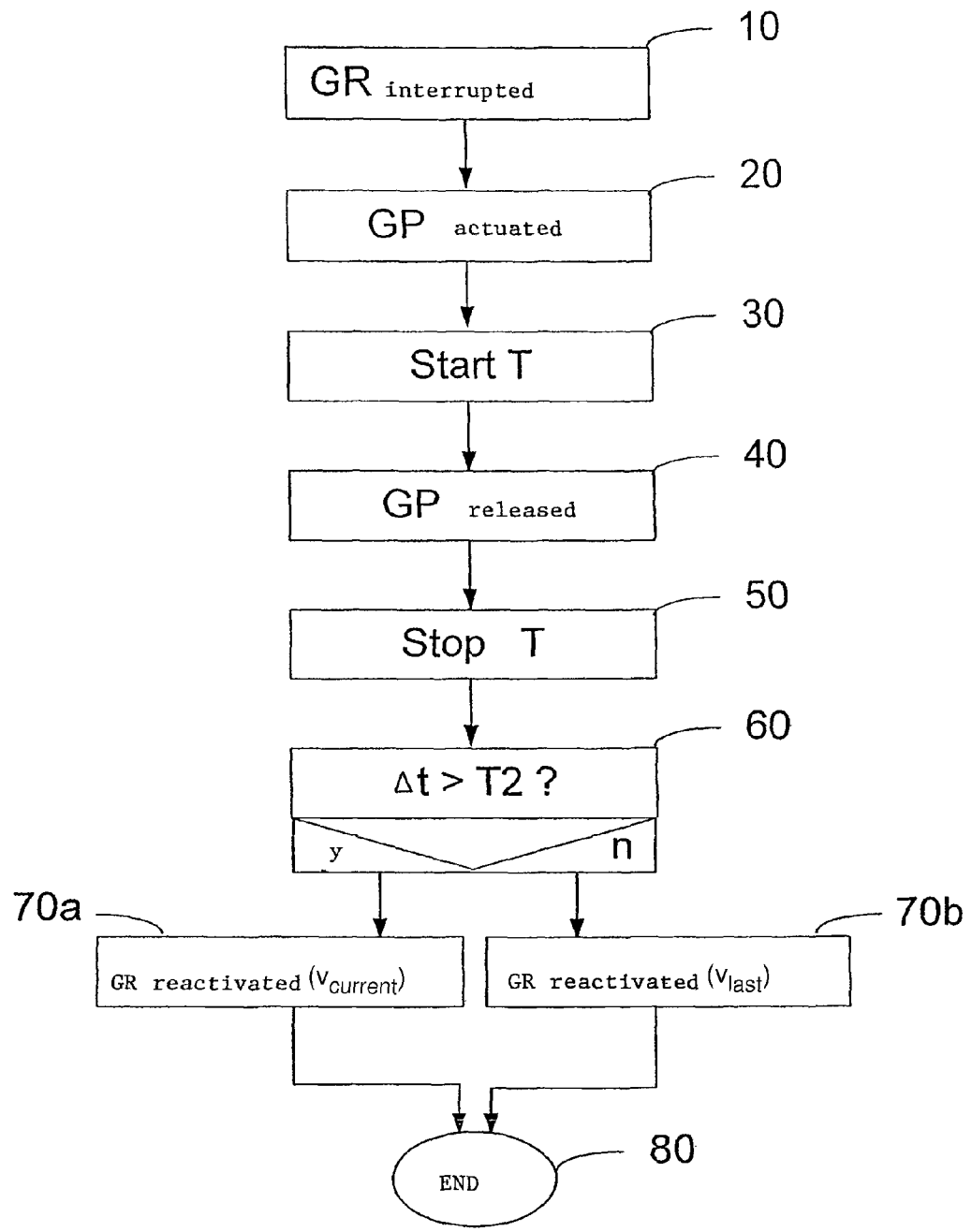

METHOD FOR REACTIVATING OPERATION OF A CRUISE CONTROL SYSTEM THAT HAD BEEN INTERRUPTED

CROSS-REFERENCE TO RELATED APPLICATIONS

This application is a continuation of PCT International Application No. PCT/EP2008/005023, filed Jun. 21, 2008, which claims priority under 35 U.S.C. §119 to German Patent Application No. DE 10 2007 031 545.9, filed Jul. 6, 2007, the entire disclosures of which are herein expressly incorporated by reference.

BACKGROUND AND SUMMARY OF THE INVENTION

The invention relates to a method for, when a vehicle is not in a stationary state, reactivating operation of a vehicle cruise control system that had been interrupted.

Motor vehicles with cruise control systems have existed for a long time. Most of the cruise control systems that are commercially available at the present time perform speed control of the motor vehicle to a predefined setpoint speed. In addition to these cruise control systems, today, it is also possible to obtain from some manufacturers cruise controls systems that are expanded to include an inter-vehicle distance control system. In principle, the generally known cruise control system, which maintains a certain predefined setpoint speed, is expanded to include an additional inter-vehicle distance control function, so that the use of such an inter-vehicle distance dependent cruise control system becomes possible even in congested highway and country road traffic. This so-called "inter-vehicle distance dependent cruise control system" maintains the predefined desired speed, when one's own lane is clear. If an inter-vehicle distance sensor system, which is mounted on the motor vehicle and which can work, in particular, based on radar, detects a target object such as a (motor) vehicle travelling ahead in the same lane, then one's own speed is adjusted to the speed of the motor vehicle travelling ahead by, for example, effecting a suitable braking torque. To some extent such systems can perform speed control as far as up to the stationary state when the vehicle is following another vehicle.

In principle, cruise control systems can be switched on and off by way of an operator control element, which is mounted, for example, on the steering wheel or on the dashboard, or by means of an operator control lever, which is mounted, for example, in the vicinity of the steering wheel. Furthermore, a cruise control system can be interrupted on the basis of a certain driving or driver maneuver, so that basically the cruise control system is still switched on, but the cruise control function is not being currently executed. The cruise control system is interrupted by switching over into a so-called "standby" mode, for example, when the driver actuates the brake pedal or the hand brake or due to an automatic stabilization by an appropriate steering intervention. Even though at that point the cruise control system is still on, the control system is not active.

In order to reactivate again the interrupted cruise control system, the driver has to actuate a corresponding operator control element, which is usually mounted on the steering wheel or in the vicinity of the steering wheel. Then, the cruise control system again performs speed control to a setpoint speed that has already been previously stored.

A cruise control system of this type is used, for example, in current BMW 5 series vehicles. If the vehicle is equipped with a so-called active cruise control system, which makes it possible to control the speed of the vehicle up to the stationary state when a vehicle is travelling ahead, then it may be necessary to actuate the gas pedal in the stationary state under certain conditions, so that the vehicle resumes the cruise control function from the stationary state.

At this point, the object of the invention is to provide a method for reactivating an interrupted cruise control system, thus, a control system, which is switched on, but is not active, of a vehicle that is not in the stationary state. Furthermore, the method permits the driver to reactivate the cruise control operation in a simple and intuitive manner.

This object is achieved by a method for reactivating an interrupted cruise control system of a vehicle, which vehicle is not in the stationary state, for the purpose of performing speed control to a predefined setpoint speed. The method reactivates the interrupted cruise control system by actuating the gas pedal of the vehicle. Advantageous further developments are disclosed herein.

The invention permits the driver to drive steadily with an active cruise control system. If the driver uses the cruise control system in the city or on a high traffic road, then the cruise control function in conventional cruise control systems is interrupted upon each actuation of the brake pedal. In order to be able to again exploit the advantages of the cruise control system, the goal is to make it possible to reactivate the cruise control system in a simple manner.

The inventive method for reactivating an interrupted cruise control system of a vehicle that is not in the stationary state is characterized in that the interrupted cruise control system can be reactivated by actuating the gas pedal. Such a reactivation is advantageous predominantly in cruise control systems that are not equipped with an inter-vehicle distance control function, since it is often the case that simple cruise control systems are not capable of maintaining the setpoint speed in heavier traffic, and for this reason the control system has to be interrupted. Then, a reactivation by actuating the gas pedal is intuitive for the driver, especially since he would like to accelerate his vehicle again and, hence, actuates the gas pedal, as would be the case in the conventional driving style.

It is advantageous if the activation of the gas pedal for reactivating the cruise control function, i.e., the cruise control system, is determined by evaluating various gas pedal actuation parameters. Thus, the cruise control system is reactivated only if upon actuating the gas pedal, (1) the gas pedal travel and/or gas pedal angle exceeds a predefined gas pedal travel limit value and/or a gas pedal angle limit value; (2) the force, which is generated on actuating the gas pedal and which is exerted on the gas pedal, exceeds a predefined gas pedal force limit value; and/or (3) the pressure, which is generated on actuating the gas pedal and which is exerted on the gas pedal, exceeds a predefined gas pedal pressure limit value. As an alternative or in addition, the pedal speed upon actuating the gas pedal can also be evaluated.

In addition, another option is to monitor the time duration, so that a reactivation takes place only if: (1) the gas pedal travel for a predefined time interval exceeds the predefined gas pedal travel limit value; (2) the force, which is generated on actuating the gas pedal and which is exerted on the gas pedal, exceeds the predefined gas pedal force limit value for a predefined time interval; and/or (3) the pressure, which is generated on actuating the gas pedal and which is exerted on the gas pedal, exceeds the predefined gas pedal pressure limit value for a predefined time interval. In order to evaluate the parameters, corresponding sensors are provided.

In a simple embodiment, the actuation of the gas pedal may be detected by a switch, which is coupled to the gas pedal and which is connected when the gas pedal is actuated.

Following reactivation, the cruise control system again performs speed control to a predefined setpoint speed. Following reactivation, either the current speed of the vehicle at the time that the gas pedal is released, or a speed that is a function of the current speed and the current acceleration, or the predefined setpoint speed at the time prior to the deactivation of the cruise control system can be set as the setpoint speed. Either the cruise control system can be configured in such a way that the current speed of the vehicle or the predefined setpoint speed at the time prior to the deactivation of the cruise control system is always set as the setpoint speed, or in such a way that the setpoint speed is set as a function of the previous settings or driver actions.

In one advantageous embodiment of the invention, after the cruise control system has been reactivated by actuating the gas pedal, the setpoint speed can be set as a function of the way in which the gas pedal is actuated. Therefore, at each reactivation the driver can select at his own discretion the setpoint speed, to which the speed control is to be performed, by the manner in which he actuates the gas pedal.

In one advantageous embodiment of the invention, after the cruise control system has been reactivated by actuating the gas pedal, the setpoint speed can be set as a function of the time duration of the gas pedal actuation. Therefore, the current speed at the time that the gas pedal is released is set as the setpoint speed, if the time duration of the gas pedal actuation exceeds a predefined second time duration limit value. If, in contrast, the gas pedal is merely tapped, thus, just briefly actuated, then the predefined setpoint speed at the time prior to the deactivation of the cruise control system is set as the setpoint speed. Thus, the driver's needs can be accommodated in a simple way.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a simplified flow diagram of the method according to an embodiment of the invention.

DETAILED DESCRIPTION OF THE DRAWING

The single FIGURE shows a simplified flow diagram for reactivating an interrupted cruise control system. This flow diagram may be a component of a routine, which is integrated into a control unit, for the purpose of controlling the travelling speed.

At step 10 the method starts as soon as the cruise control system GR is interrupted. Step 20 checks whether the gas pedal GP is being actuated when the cruise control system GR is interrupted. For this purpose, it can be evaluated, for example, whether a switch, operatively coupled to the gas pedal GP, is connected when the gas pedal GP is appropriately actuated. As soon as the actuation of the gas pedal "GP actuated" is detected, a timer T is started in step 30, and then the routine jumps to step 40, where it is checked as to when the gas pedal GP is released again. As soon as it is detected that the gas pedal GP has been released, the routine jumps to step 50, and the timer T is stopped.

In the next step 60, the determined time interval $\Delta t$, thus, the time duration of the actuation of the gas pedal GP for reactivating the cruise control system GR, is evaluated. If the gas pedal GP is just briefly tapped, that is, the period of time during which the gas pedal actuation GP occurred is not greater than the predefined time duration limit value T2, then the cruise control system GR is reactivated in step 70b and the last predefined setpoint speed $v_{last}$ at the time prior to the deactivation is set as the setpoint speed.

If, however, the gas pedal GP was actuated for a longer period of time, so that the determined time interval $\Delta t$ exceeds the predefined time duration limit value T2, then step 70a reactivates the cruise control system GR, and the current speed $v_{current}$ at the time that the gas pedal is released is set as the setpoint speed.

The flow diagram ends after the reactivation of the cruise control system GR in step 80.

In summary, the invention offers the advantage that it is possible for the driver to reactivate an interrupted cruise control system in an especially simple and intuitive way. The driver does not have to search first for the actuating button, lever or switch on the steering wheel for the reactivation operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a cruise control system of a vehicle, the method comprising the acts of:
   performing a cruise control function of the cruise control system;
   interrupting the cruise control function; and
   reactivating the cruise control function when the vehicle is not stationary in response to actuating a gas pedal of the vehicle, wherein the cruise control function is reactivated, only if upon actuating the gas pedal, at least one of:
   (a) the gas pedal travel exceeds a predefined gas pedal travel limit value,
   (b) a gas pedal speed, which depends on a direction of motion, exceeds a predefined speed limit value, which depends on the direction of motion,
   (c) a force, which is generated on actuating the gas pedal and which is exerted on the gas pedal, exceeds a predefined gas pedal force limit value,
   (d) a pressure, which is generated on actuating the gas pedal and which is exerted on the gas pedal, exceeds a predefined gas pedal pressure limit value, and
   (e) a time duration of the gas pedal activation exceeds a predefined time duration limit value.

2. The method according to claim 1, wherein following the reactivation of the cruise control function, the method further comprises one of:
   setting a current speed of the vehicle at the time that the gas pedal is released or a speed that is a function of the current speed and the current acceleration as the setpoint speed; or
   setting a predefined setpoint speed at a time prior to the deactivation of the cruise control system as the setpoint speed.

3. The method according to claim 2, wherein following reactivation of the cruise control function, the current speed at the time that the gas pedal is released is set as the setpoint speed if a time duration ($\Delta t$) of the gas pedal actuation exceeds a predefined second time duration limit value.

4. The method according to claim 2, wherein following reactivation of the cruise control function, the predefined setpoint speed at the time prior to the deactivation of the cruise control function is set as the setpoint speed if a time duration ($\Delta t$) of the gas pedal actuation does not exceed a predefined second time duration limit value.

5. The method according to claim 1, wherein after the cruise control function has been reactivated by actuating the gas pedal, a setpoint speed is set as a function of the manner in which the gas pedal was actuated.

6. The method according to claim 1, wherein following reactivation of the cruise control function, a current speed at the time that the gas pedal is released is set as a setpoint speed if a time duration ($\Delta t$) of the gas pedal actuation exceeds a predefined second time duration limit value.

7. The method according to claim 1, wherein following reactivation of the cruise control function, a predefined setpoint speed at a time prior to the deactivation of the cruise control function is set as a setpoint speed if a time duration ($\Delta t$) of the gas pedal actuation does not exceed a predefined second time duration limit value.

\* \* \* \* \*